Dec. 19, 1950     O. L. ENGSTROM     2,534,504
BEVERAGE DISPENSING APPARATUS
Filed Sept. 14, 1946     3 Sheets-Sheet 1
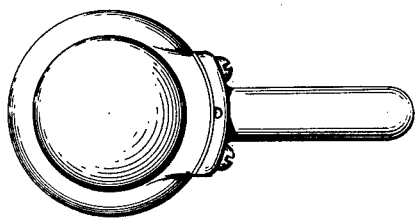
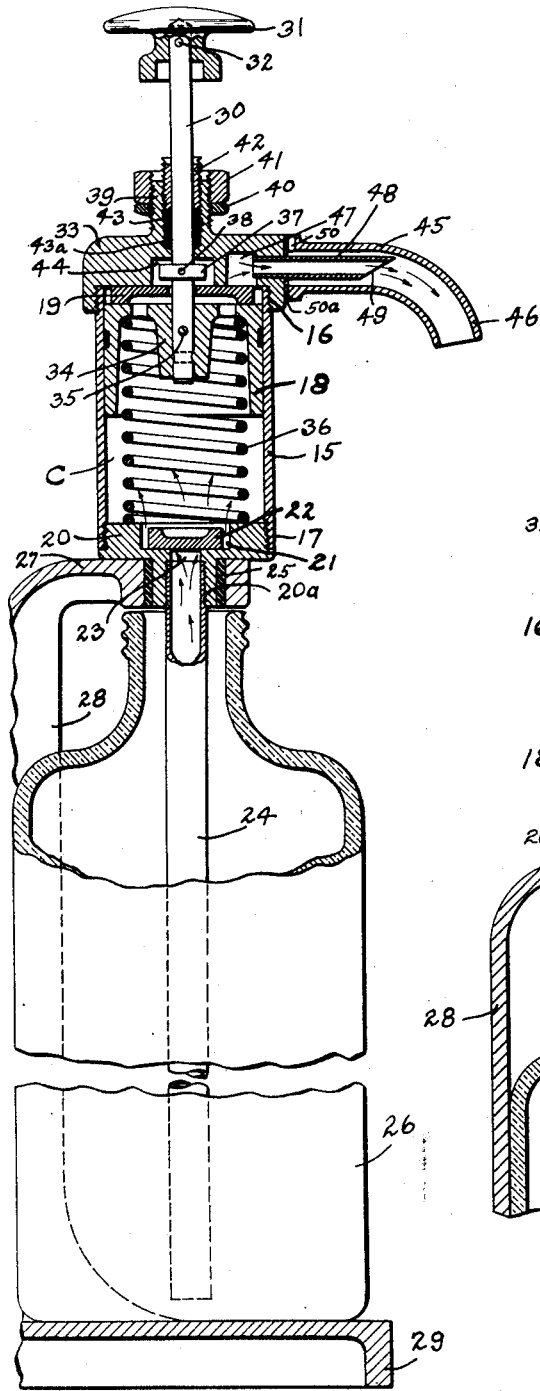
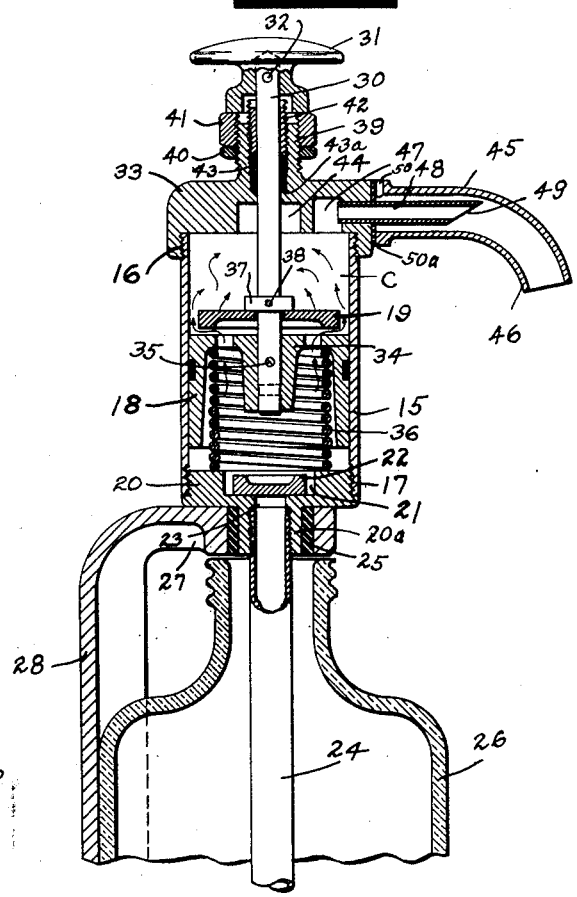
INVENTOR
OSCAR L. ENGSTROM
BY
H. G. Manning
ATTORNEY Dec. 19, 1950     O. L. ENGSTROM     2,534,504
BEVERAGE DISPENSING APPARATUS
Filed Sept. 14, 1946     3 Sheets-Sheet 2
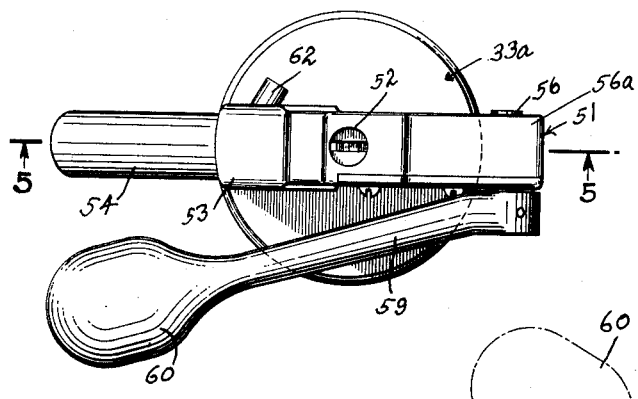
INVENTOR
OSCAR L. ENGSTROM
BY H. G. Manning
ATTORNEY Dec. 19, 1950     O. L. ENGSTROM     2,534,504
BEVERAGE DISPENSING APPARATUS
Filed Sept. 14, 1946     3 Sheets-Sheet 3
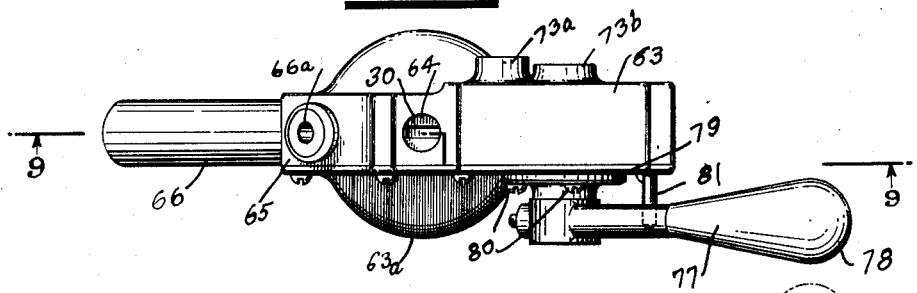
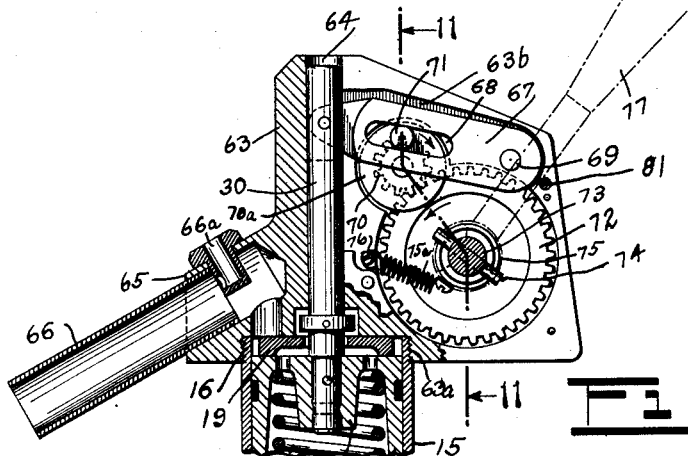
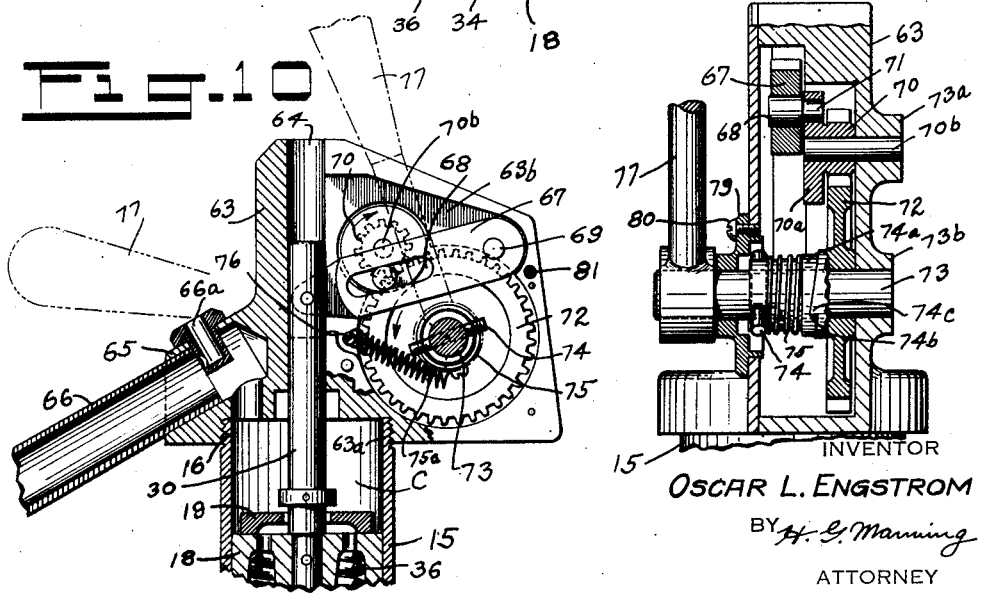
INVENTOR
OSCAR L. ENGSTROM
BY H. G. Manning
ATTORNEY Patented Dec. 19, 1950

2,534,504

UNITED STATES PATENT OFFICE 2,534,504

BEVERAGE DISPENSING APPARATUS

Oscar L. Engstrom, New York, N. Y.

Application September 14, 1946, Serial No. 697,016

10 Claims. (Cl. 222—383)

This invention relates to pumps, and more particularly to a beverage dispensing pump for use on the top of a beverage supply bottle.

One object of the present invention is to provide a beverage dispensing pump of the above nature which is adapted to dispense a measured charge of liquid accurately, dependably, and neatly at each stroke of the plunger handle.

A further object is to provide a device of the above nature comprising an upper pump body and a depending tube adapted to be inserted below the level of the liquid in a beverage supply bottle.

A further object is to provide a device of the above nature in which the liquid has a one-way upward flow through a hollow piston, and said device has a side nozzle for delivering successive portions of the dispensed liquid into a suitable receptacle held beneath the side delivery spout.

A further object is to provide a device of the above nature in which means are provided inside the delivery spout to effectively prevent "after-dripping" of the beverage dispensed therefrom.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing three forms in which the invention may conveniently be embodied in practice.

In the drawings,

Fig. 1 represents a top plan view of the first form of the invention employing a reciprocating pump plunger with a hand knob at the top thereof.

Fig. 2 is a side longitudinal sectional view of the same showing the appearance of the beverage dispensing pump when the plunger knob and piston valve are in their uppermost positions after the delivery of a charge of liquid.

Fig. 3 is a longitudinal sectional view of the same, as it appears with the plunger handle and piston valve in depressed condition and with the measuring chamber full of liquid.

Fig. 4 is a top plan view of a second form of the beverage dispensing pump employing a swinging handle for operating the depressible piston.

Fig. 5 is a longitudinal sectional view of the same, similar to Fig. 2, taken along the line 5—5 of Fig. 4, as it appears with the pump piston valve in its raised uppermost position.

Fig. 6 is a longitudinal sectional view, similar to Fig. 3, showing the appearance of the same when the valve is in depressed position, and the measuring chamber is full of liquid.

Fig. 7 is a fragmentary sectional view, taken along the inclined line 7—7 of Fig. 5.

Fig. 8 is a top plan view of a third form of the invention, in which the valve plunger is connected to a swingable operating handle by a gear mechanism.

Fig. 9 is a fragmentary longitudinal sectional view, similar to Figs. 2 and 5, taken along the line 9—9 of Fig. 8, and showing the piston and valve in raised position.

Fig. 10 is a fragmentary longitudinal sectional view similar to Figs. 3 and 6, with the piston and valve shown in depressed position.

Fig. 11 is a fragmentary longitudinal sectional view of the same, taken along the broken line 11—11 of Fig. 9.

Referring now to the drawings, in which like reference numerals denote corresponding parts throughout the several views, the numeral 15 indicates a pump casing having a threaded upper exterior section 16 and a tapped interior bottom section 17. The numeral 18 indicates a hollow pump piston which is slidable in a chamber C within the casing 15, and the numeral 19 indicates an inverted cupped valve disk which is adapted to rest upon the top of the hollow piston 18.

Provision is also made of a threaded bottom head 20 screwed into the lower tapped end of the casing 15 integral therewith. The head 20 has a reduced depending central neck 20a above which is a countersunk valve recess 21 for receiving a small lower valve disk 22 cupped on its upper surface, as shown. The bottom head 20 is provided with a tapped central passage 23, within which is screwed an elongated depending tube 24 which extends down nearly to the bottom of a beverage supply bottle 26.

The depending neck 20a is surrounded by a cylindrical rubber gasket 25 fitted into an aperture in a substantially horizontal arm 27 of a bracket 28, secured to a horizontal base 29, as clearly shown in Fig. 2.

In order to facilitate the manual operation of the pump, provision is made at the top thereof of a vertical operating plunger 30, having a handle knob 31 secured thereto by means of a cross pin 32.

The casing is provided with an upper head 33 screwed to the upper end thereof. Provision is also made of a tubular plug 34 integral with the sleeve piston 18 and connected with the plunger 30 by means of a horizontal cross pin 35.

In order to cause the piston 18 to be moved upwardly automatically after each time the plunger has been depressed, provision is made of a coiled spring 36, fitted within the tubular hollow piston 18 and having its bottom end resting upon the bottom head 20.

The upper head 33 is provided with a central bottom recess 44 within which is located a collar 37 secured to the plunger 30 by a pin 38 and which is adapted to engage the valve disk 19 when the handle 31 is depressed.

The upper head 33 is also provided with an upstanding tubular neck 39, which is threaded exteriorly for receiving an adjustable knurled nut 40, above which is a lock nut 41. The inside of the neck 39 is tapped to engage a hollow screw 42, below which is a cylindrical sleeve packing 43 seated in a shoulder 43a above the recess 44.

The upper head 33 is also provided with a lateral spout 45 having a downturned end 46 for delivering the liquid discharged from the pump to any suitable receptacle, not shown.

In order to prevent "after-dripping" of the beverage subsequent to the discharge operation, the delivery spout 45 is provided in its horizontal upper section with an inner tube 48 communicating with a recess 47 within the bottom of the head 33, and having a bevelled outer end 49. The inner portion of the spout 45 has a vent hole 50 in its top section and said spout is sealed tightly against leaking by a gasket ring 50a, as clearly shown in Figs. 2 and 3.

Operation of first form

In operation, when the handle knob 31 is raised by the action of the spring 36, or manually, the pump piston 18 will be caused to be lifted and beverage from the bottle 26 will rise through the tube 24 by suction and said beverage will pass into the chamber C within the casing 15. The amount of liquid pumped by each stroke of the piston 18 is accurately determined by the adjustment of the knurled nuts 40, 41 on the plunger 30, said nut 40 serving to limit the amount the handle 31 may be depressed, at which time liquid will lift the upper valve disk 19 and pass upwardly around it, as shown in Fig. 3. The beverage will then fill the space above the piston 18, and when the latter is again raised, a measured quantity thereof will be dispensed through the spout 45.

Second form of invention

In the modified form of the invention, shown in Figs. 4–7, the lower portion of the pump is identical in all respects with that shown in the first form. Provision is made, however, of an upper head 51 of flat-sided substantially triangular shape, having a vertical central passage 52, within which the plunger rod 30 is adapted to slide, and having a cylindrical base 33a.

The head 51 has an inclined side socket 53 for receiving a cylindrical delivery spout 54 which is connected at its upper end to the measuring chamber C within the casing 15, by means of a short vertical passage 55. In this form of the invention, provision is made of a short horizontal shaft 56 located in a laterally offset extension 56a of the head 51, said shaft passing through a triangular cavity 57 and serving as a fulcrum for a plunger-operating arm 58 having an end slot 58a slidably embracing a horizontal pin 58b in the slotted end of the plunger rod 30.

Outside the head 51 the shaft 56 has an extension 56b to which is connected a handle arm 59 having an enlarged rounded operating head 60 on the extremity thereof. The numeral 61 indicates a recess in the bottom of the upper head 51 for receiving a collar 37 as in the first form of the invention.

Provision is also made of a short inclined vent tube 62 passing through the spout 54 and the socket 53, said vent tube serving to permit the passage of air into the delivery spout 54 to speed up the discharge of the liquid during the dispensing operation, and thus prevent "after dripping."

Operation of the second form

In the operation of the second form of the invention, it is only necessary to swing the handle 60 manually up and down to pump the liquid intermittently from the bottle, and deliver it through the delivery spout 54 in a manner similar to the operation of the first form of the invention.

Third form of invention

In the third form of the invention, shown in Figs. 8–11, a flat-sided upper head 63 is provided having a lower central tapped recess 63a screwed onto the upper threaded end of the casing 15, as clearly shown in Figs. 9 and 10. The upper head 63 is also provided with a vertical passage 64 open at the top, for receiving the reciprocating plunger 30, as in the first two forms of the invention.

The beverage or other liquid is adapted to be dispensed from the casing 15 through an inclined socket 65, within which is fitted a delivery spout 66, above which said socket 65 has a vent tube 66a to facilitate the dispensing of the measured charge from the pump and avoid "after-dripping."

In order to produce a more rapid operation of the pump than in the first two forms of the invention, the head 63 is provided with a triangular cavity 63b within which is a swingable arm 67 having a closed slot 68, said arm having an end pivot pin 69 secured to the sides of said head 63. Provision is made in the cavity of the head 63 of a loose pinion 70 having an enlarged integral circular collar 70a, which is adapted to rotate upon a shaft 70b mounted in an outwardly-extending boss 73a on said head. The collar 70a is provided with an outstanding crank pin 71, which is adapted to fit within the slot 68 of the arm 67, for a purpose to be hereinafter described.

The pinion 70 is adapted to mesh with a gear 72, mounted on a shaft 73, which is loosely mounted in the boss 73b on the outside of the head 63. The shaft 73 extends out through the opposite side of the head 63 and carries a lock cross pin 74 which engages a coil spring 75 adapted to exert pressure upon a clutch 74a having ratchet teeth 74b for engaging similar ratchet teeth 74c mounted in the inner face of the gear 72.

A coil spring 75a of small diameter is adapted to connect the clutch 74a with a pin 76 on the side of the head 63 in order to automatically return said clutch to the initial position as the operating handle 77 is swung back and forth. A stop pin 81 is also secured to the head 63.

The operating handle 77 is provided with an enlarged rounded end 78, and as clearly shown in Fig. 8, said handle is seated upon a closure plate 79 which is secured to said head by a plurality of screws 80 (three in this instance).

Operation of third form

In the operation of this form of the invention, when the handle 77 is depressed, a charge will be admitted to the chamber C during the first half of its downward motion; during the second half of its stroke, the piston will be raised by spring action and the charge will be delivered through the spout to the receptacle, as shown. It will thus be seen that a complete dispensing cycle will occur with every down stroke of the handle. It will also be clear that the spring 36 in the measuring chamber C will serve to restore the operating handle 77, the piston 18 and associated parts to their initial positions shown in Fig. 1 after the completion of the downward dispensing stroke of the handle 77.

While there have been disclosed in this specification three forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a liquid measuring dispensing pump, a cylindrical vertical casing having upper and lower apertured closure heads, a hollow apertured piston slidable in said casing, a coiled spring in said casing resting upon said lower head and pressing upwardly upon said piston, a top valve disk seated on said piston, said upper closure head comprising means engageable with said top valve disk for limiting upward movement of said top valve disk and said piston, a check valve disk seated on said lower head, a depending suction tube connected to said lower head for insertion below the level of the liquid in a supply bottle located beneath said lower head, and a vertical plunger connected to said piston and extending up through the upper head for permitting said piston to be manually depressed to cause a charge of liquid to pass above said piston, and a delivery spout connected to the side of said upper head for discharging the liquid, when said plunger is released, by the automatic lifting of said piston by the action of said spring.

2. In a liquid measuring dispenser, a vertical casing having upper and lower apertured closure heads at its ends, an apertured piston slidable in said casing, a coiled spring in said casing resting upon said lower head and pressing upwardly upon said piston, a top valve disk seated on said piston, said upper closure head comprising means engageable with said top valve disk for limiting upward movement of said top valve disk and said piston, a check valve disk seated on said lower head, a depending suction tube connected to said lower head for insertion below the level of the liquid in a supply bottle located beneath said lower head, a vertical plunger connected to said piston and extending up through the upper head and having a handle for manually depressing said piston to cause a charge of liquid to pass above said piston, and a delivery spout connected to the side of said upper head for discharging the liquid when said plunger is released by the automatic lifting of said piston by the action of said spring.

3. The invention defined in claim 2, in which provision is made of a short tube within said delivery spout and provided with an inclined end to prevent "after drippage" of liquid therefrom.

4. The invention defined in claim 2, in which said plunger has a stop collar mounted thereon for engaging the top of said upper valve disk when said plunger is depressed.

5. The invention defined in claim 2, in which said upper head is provided with means to adjust the downward stroke of said plunger so as to vary the measured charge dispensed at each stroke thereof.

6. The invention defined in claim 2, in which said plunger has its lower end secured to the central portion of said piston, and said upper valve disk has a center portion offset upwardly out of contact with said piston, and a flat annular edge portion adapted to seat against said piston.

7. The invention as defined in claim 2, in which said upper head has an interior swinging arm provided with an end slot slidably embracing a horizontal pin on said plunger, a horizontal pivot shaft for said arm extending outside of said head, and an exterior operating handle secured to the outside portion of said shaft.

8. The invention as defined in claim 2, in which said upper head has an interior gear mechanism connected to said plunger to cause said piston to make one complete down and up cycle each time the plunger handle is depressed, and also including means for limiting movement of said piston to said cycle.

9. In a liquid measuring dispenser, a vertical casing having upper and lower apertured closure heads at its ends, an apertured piston slidable in said casing, a coil spring in said casing and resting upon said lower head and pressing upwardly upon said piston, a top valve disk seated on said piston, a check valve disk seated upon said lower head, a depending suction tube connected to said lower head for insertion below the level of the liquid in a supply bottle located beneath said lower head, a vertical plunger connected to said piston and extending up through the upper head, said upper closure head being provided with a horizontal shaft passing therethrough, a gear and pinion mechanism connected to said shaft, a slotted swinging arm pivotally mounted in said head, means to pivotally connect said arm to said plunger for depressing said piston to cause a charge of liquid to pass above said piston, an exterior operating handle mounted on said shaft, a collar secured to said gear and having a pin located in the slot of said arm to cause said piston to reciprocate once for each depression of the plunger, and a delivery spout connected to the side of said upper closure head for discharging the liquid when said plunger is released by the automatic lifting of said piston by the action of said coil spring.

10. In a liquid measuring dispenser, a vertical casing having upper and lower apertured closure heads at its ends, an apertured piston slidable in said casing, a coil spring in said casing resting upon said lower head and pressing upwardly upon said piston, a top valve disk seated upon said piston, a check valve disk seated upon said lower head, a depending suction tube connected to said lower head for insertion below the level of the liquid in a supply bottle located beneath said lower head, a vertical plunger connected to said piston and extending up through the upper closure head, a handle for manually depressing said piston to cause a charge of liquid to pass above said piston, provision being made in said upper closure head of interior gear mechanism connected to said plunger and so proportioned as to cause said piston to make a down and up motion each time said handle is depressed, spring means to thereafter automatically return said plunger handle to its initial uppermost position, and a delivery spout connected to the side of said upper head for discharging the liquid when said plunger is released by the automatic lifting of said piston by the action of said coil spring.

OSCAR L. ENGSTROM.

REFERENCES CITED

The following references are of record in the file of this patent:

UNITED STATES PATENTS

| Number | Name | Date |
|---|---|---|
| 981,296 | Marsh | Jan. 10, 1911 |
| 1,081,817 | Deming | Dec. 16, 1913 |
| 1,264,554 | Peron | Apr. 30, 1918 |
| 1,530,074 | Eckert | Mar. 17, 1925 |
| 1,715,522 | Townsend | June 4, 1929 |
| 1,897,154 | Van Schyndle | Feb. 14, 1933 |
| 2,105,646 | Goldfarb | Jan. 18, 1938 |

FOREIGN PATENTS

| Number | Country | Date |
|---|---|---|
| 292,273 | Great Britain | June 21, 1928 |